US008027681B2

(12) United States Patent
Burgess et al.

(10) Patent No.: US 8,027,681 B2
(45) Date of Patent: Sep. 27, 2011

(54) METHOD AND APPARATUS TO ALLOW HAND-OFF FROM A MACROCELL TO A FEMTOCELL

(75) Inventors: John Kenney Burgess, Morristown, NJ (US); Robin Jeffrey Thompson, Batavia, IL (US)

(73) Assignee: Alcatel Lucent, Paris (FR)

( * ) Notice: Subject to any disclaimer, the term of this patent is extended or adjusted under 35 U.S.C. 154(b) by 1067 days.

(21) Appl. No.: 11/758,477

(22) Filed: Jun. 5, 2007

(65) Prior Publication Data
US 2008/0305801 A1  Dec. 11, 2008

(51) Int. Cl.
    *H04W 4/00* (2009.01)
(52) U.S. Cl. ......... 455/436; 455/438; 370/311; 370/331
(58) Field of Classification Search .................. 455/436, 455/438; 370/331, 311, 370
    See application file for complete search history.

(56) References Cited

U.S. PATENT DOCUMENTS

| | | |
|---|---|---|
| 6,192,250 B1 | 2/2001 | Buskens et al. |
| 6,377,799 B1 | 4/2002 | Hameleers et al. |
| 6,453,162 B1 | 9/2002 | Gentry |
| 7,408,896 B2 | 8/2008 | Chen et al. |
| 7,471,950 B1 | 12/2008 | Oh et al. |
| 7,652,984 B1 | 1/2010 | Kotecha |
| 2004/0125758 A1 | 7/2004 | Hayduk |
| 2004/0246990 A1 | 12/2004 | Krishnamurthi et al. |
| 2005/0245263 A1 | 11/2005 | Ejzak |
| 2006/0120355 A1 | 6/2006 | Zreiq et al. |
| 2006/0129646 A1 | 6/2006 | Rhee et al. |
| 2006/0206504 A1 | 9/2006 | Cai et al. |
| 2006/0268900 A1 | 11/2006 | Larsson et al. |
| 2006/0291419 A1 | 12/2006 | McConnell et al. |
| 2007/0002844 A1 | 1/2007 | Ali |

(Continued)

FOREIGN PATENT DOCUMENTS

CN  1852553A A1  10/2006

(Continued)

OTHER PUBLICATIONS

Airvana: "Network Architecture for cdma2000 Femto and Pico Cell Applications to Special Radio Environments" [Online] May 2, 2007, pp. 1, 3-12.

(Continued)

*Primary Examiner* — Pierre-Louis Desir
(74) *Attorney, Agent, or Firm* — Fay Sharpe LLP

(57) ABSTRACT

A method for hand-off of a CDMA access mobile from a macrocell to a femtocell is disclosed. The method includes tracking each femtocell which mobile stations have allowed access incorporating a mobile station identification for each of the mobile stations. The method continues with storing the mobile station identification for each femtocell. This may occur in a database or similar structure. The message continues on with requesting a hand-off from the macrocell to the femtocell via PN offset and the method concludes with querying all femtocells that have that PN offset that are within range of the macrocell's neighbor list. If only one femtocell fits that criteria the method is done. If more than one femtocell fits that criteria, a priority list may be set up based at least in part on the number of times and/or frequency that the mobile station has been allowed access on the femtocell. The method could include allocating resources for all high priority femtocells and cleaning up resources for the femtocells that do not send a hand-off complete message.

25 Claims, 3 Drawing Sheets

U.S. PATENT DOCUMENTS

| | | | |
|---|---|---|---|
| 2007/0043947 A1 | 2/2007 | Mizikovsky et al. | |
| 2007/0165612 A1 | 7/2007 | Buckley | |
| 2007/0206563 A1 | 9/2007 | Silver et al. | |
| 2008/0020771 A1 | 1/2008 | Trayer | |
| 2008/0063159 A1 | 3/2008 | Pounds | |
| 2008/0064369 A1 | 3/2008 | Xie et al. | |
| 2008/0101301 A1* | 5/2008 | Thomas et al. | 370/335 |

FOREIGN PATENT DOCUMENTS

| | | |
|---|---|---|
| EP | 1798896 A1 | 6/2007 |
| JP | 2007060181 | 3/2007 |
| WO | WO 2005/099185 A1 | 10/2005 |
| WO | WO 2007/015068 A1 | 2/2007 |
| WO | 2007038961 A1 | 4/2007 |
| WO | 2007045264 A1 | 4/2007 |
| WO | WO 2008/055251 A2 | 5/2008 |
| WO | WO 2008/055251 A3 | 6/2008 |

OTHER PUBLICATIONS

Tatara Systems: "Tatara Convergence Server Datasheet" [Online] 2006, pp. 1-2.

PCT/US2008/006953, PCT International Search Report, Dec. 11, 2008, 4 pages.

PCT/US2008/006953, PCT Written Opinion of the International Searching Authority, Dec. 11, 2008, 11 pages.

Mani et al.: "Access to IP Multimedia System of UMTS Via Packet Cable Network" Wireless Communications and Networking Conference, 2005 IEEE New Orleans, LA, USA, Mar. 13-17, 2005, Piscataway, NJ, US March 13-17, 2005, p. 2459-2465.

Sun et al.: "A SIP-Enabled All-IP Architecture for Converged Next-Generation Networks", Bell Labs Technical Journal, Wiley, CA, US; vol. 9, No. 3; Nov. 8, 2004, pp. 15-37.

"Digital cellular telecommunications system (Phase 2+); Universal Mobile Telecommunications System (UMTS); IP Multimedia Subsystem (IMS) Sh interface; Signaling flows and message contents (3GPP TS 29.328 version 7.6.0. Release 7)" Jun. 1, 2007 (44 pages).

ICS Architecture—IMS CS Control Channel (ICCC), 3GPP TSG WG2 Architecture—S2 R8 Ad Hoc, SR-070672, St. Louis, MO, Feb. 12-15, 2007, 2 pages.

Patent Abstracts of Japan, English translation of Japanese Patent Application JP 2007-060181 (published Mar. 8, 2007) using Japanese Patent Office web site, generated and printed Jan. 23, 2009, 15 pages.

Event Helix (MGCF Interfaces) discloses a H.248 signaling system; IMS caller initiated call release (Feb. 25, 2008), EventStudio System Designer 4.0 (3 pages).

Vanghi et al., The CDMA200 System for Mobile Communications, Prentice Hall PTR, Pearson Education, Inc., 2004, pp. 490-491 (4 Pages).

* cited by examiner

METHOD AND APPARATUS TO ALLOW HAND-OFF FROM A MACROCELL TO A FEMTOCELL

BACKGROUND OF THE DISCLOSURE

This disclosure relates to a method and apparatus for converting a call from one network to a femtocell. More particularly, this disclosure relates to a method and apparatus for a hand-off from a macrocell to a femtocell or other small base station models in an Internet protocol Multimedia Subsystem (IMS) network.

While the disclosure is particularly directed to voice and network transfer and thus will be described with specific reference thereto, it will be appreciated that the disclosure may have usefulness in other fields and applications. For example, this disclosure may be used in a variety of data transfer systems and methods in order to support gradual migration from one network to another, thereby allowing service provides to invest their time and energy in future IMS technology.

By way of background, Code Divisional Multiple Access (CDMA) mobiles are in use all over the world. Many people use mobile stations in order to transfer voice and data through a well established radio network. Currently, there are many known methods for converting voice path handoffs across the CDMA radio network.

The IMS/Session Initiation Protocol (SIP) based network is a network with an internet backbone that supports many types of voice and data transfer. Examples of this kind of transfer include Voice-over Internet Protocol (VoIP). Although VoIP technology is less commonly used than other types of voice transfer, it is gaining popularity throughout the world.

Currently in the industry, there is no effective way to convert a 3G1x signal that originates or is intended for the CDMA network to an IMS network.

One major difficulty in finding a solution to a CDMA mobile migration from a CDMA based network to an IMS network involves the difficulty of a hand-off application server finding the correct femtocell to hand off to. For example, when transferring from one macrocell to another, the hand-off is simplified because there are very few possible cells within a certain distance which allow a hand-off to take place. However, with femto cells there are many cells within or adjacent to a macrocell. Thereby it is difficult to find the correct femtocell. Unfortunately, there are not enough Pseudorandom Number (PN) offsets for each femtocell to have a unique PN offset. Even using a neighbor list which will only include relatively nearby femtocells there are still too many femtocells within the predetermined radius to give each femtocell their own pseudo random number offset.

Therefore there is a need in the industry to supply a data network and allow for IP awareness to take place on the CDMA network. There is also a need in the industry for a method which will allow a handoff application server to accurately find the correct femtocell which should be receiving the hand-off for any particular mobile station.

There is also a need in the industry to allow IMS network coverage and capacity to be extended to signals originally made over other networks. There is further need for these transfers to be converted and received on an IMS network and managed through a seamless means. There is also a need for a method to allow hand-offs from a CDMA network to an IMS network.

The present disclosure contemplates a new and improved system and method that resolves the above-referenced difficulties and others.

CROSS REFERENCE TO RELATED PATENTS AND APPLICATIONS

This application is related to U.S. application Ser. No. 11/758,555, filed Jun. 5, 2007, entitled "SESSION INITIATION PROTOCOL/INTERNET PROTOCOL MULTIMEDIA SUBSYSTEM BASED ARCHITECTURE FOR SUPPORTING 3G1x VOICE/DATA (see U.S. Pat. App. Pub. No. 2008/0304462) and U.S. application Ser. No. 11/758,557, filed Jun. 5, 2007, entitled "METHOD AND APPARATUS TO ALLOW HAND-OFF OF A CDMA MOBILE FROM IMS FEMTOCELL TO CIRCUIT MSC, see (U.S. Pat. App Pub. No. 2008/0304451). These applications are hereby incorporated by reference.

SUMMARY OF THE INVENTION

A method and apparatus for hand-off of a CDMA mobile from a macrocell to a femtocell is provided. This disclosure allows for the conversion of a call that originated on the CDMA network to be carried and processed to an IMS IP network without changing or manipulating the mobile station.

In one aspect of the disclosure the method includes tracking for each mobile station which femtocell it has been authorized to use and which have been accessed, said mobile stations have a mobile station identification number. The method further includes storing the mobile station identification number for each femtocell, requesting a hand-off from a macrocell to a femtocell incorporating a pseudo random number offset and querying the database for history of connections or calls that match the pseudo random number offset for a mobile identification number that matches the mobile station identification number of the mobile station.

In accordance with another aspect of the present disclosure, the system includes setting a priority for the femtocells based at least in part on the number times that the mobile station has been allowed access to the femtocells and allocating resources for the femtocells that have the highest priority.

In accordance with another aspect of the present disclosure, the system includes requesting a hand-off when the pseudo random number offset has a signal strength that is above the signal strength threshold.

In accordance with another aspect of the present disclosure, the method includes that the mobile station identification is stored in a femtocell database.

In accordance with another aspect of the present disclosure, the method includes that when querying all femtocells include querying femtocell database.

In accordance with another aspect of the present disclosure, the method includes that priority be based on the frequency of times a mobile station identification is stored in a femtocell database.

In accordance with another aspect of the present disclosure, the method includes requesting a hand-off while the mobile station is roaming.

In accordance with another aspect of the present disclosure, the method includes allowing access to a target femtocell through a user interface.

In accordance with another aspect of the present disclosure, a system for hand-off of a CDMA mobile from a macrocell to a femtocell is disclosed. The system includes a database configured to store a mobile station identification number of a mobile station that has been allowed access to a femtocell, a tracking module configured to track which mobile stations have had access to which femtocells and store the information on the database and a Hand-Off Application Server (HOAS) configured to receive a hand-off request for a mobile station and facilitate hand-offs based at least partially upon a pseudo random number offset and prioritized list arranged at least in part by the number of frequency of times the femtocell-authorized mobile station has registered on each femtocell.

In accordance with another aspect of the present disclosure, the system includes that the prioritized list include femtocells with the same pseudo random number offset.

In accordance with another aspect of the present disclosure, the system includes an anchor mobile switching center (MSC) that facilitates session control in order to regulate bandwidth and maintain Quality of Service (QoS) through a call session control function.

In accordance with yet another aspect of the present disclosure, the system includes an anchor MSC that is configured to supply supplementary features to the mobile station through a feature server.

In accordance with yet another aspect of the present disclosure, the method includes tracking usage of mobile stations that have registered on femtocells, storing usage in database associated with the femtocells, detecting an identifying code that has a power signal that is above a predetermined power threshold, sending a hand-off request for a call to an application server that is configured to facilitate hand-offs, querying femtocell databases that are associated with the identifying code, and prioritizing the femtocells at least in part on prior usage.

In accordance with another aspect of the present disclosure, the method includes sending an invite to each of the highest prioritized femtocells.

In accordance with another aspect of the present disclosure, the method includes picking a Walsh Function or Media Access Control Identifier (MAC ID) that is less likely to be in use by any of the plurality of possible hand-off targets as identified earlier, and sending a common invite to most, or, if possible, all of the highest prioritized femtocells. These femtocells would respond with an acceptance or denial of the resource reservation including information regarding available resources, so if any of the highest prioritized femtocells does deny the request, a superseding request can be sent for a resource all these femtocells have in common. After the reservation is accepted by all femtocells, an acknowledgement will be sent to them to trigger the set-up of the connection/call with the selected resource.

In accordance with another aspect of the present disclosure, the method includes releasing resources for the highest priority femtocells that did not receive the hand-off.

In accordance with yet another aspect of the present disclosure, the method includes that the identifying code is a pseudo random number offset.

In accordance with another aspect of the present disclosure, the method includes that the call is a data call.

In accordance with another aspect of the present disclosure, the method includes that the call originated on a CDMA network.

In accordance with another aspect of the present disclosure, the method includes that one or more secondary pilots, possibly at a lower power, could also be broadcast by the FemtoCell (as per patent application Ma 23-25) and used to further reduce the list of possible target cells.

DESCRIPTION OF THE DRAWINGS

The presently described embodiments exist in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Figure 1:
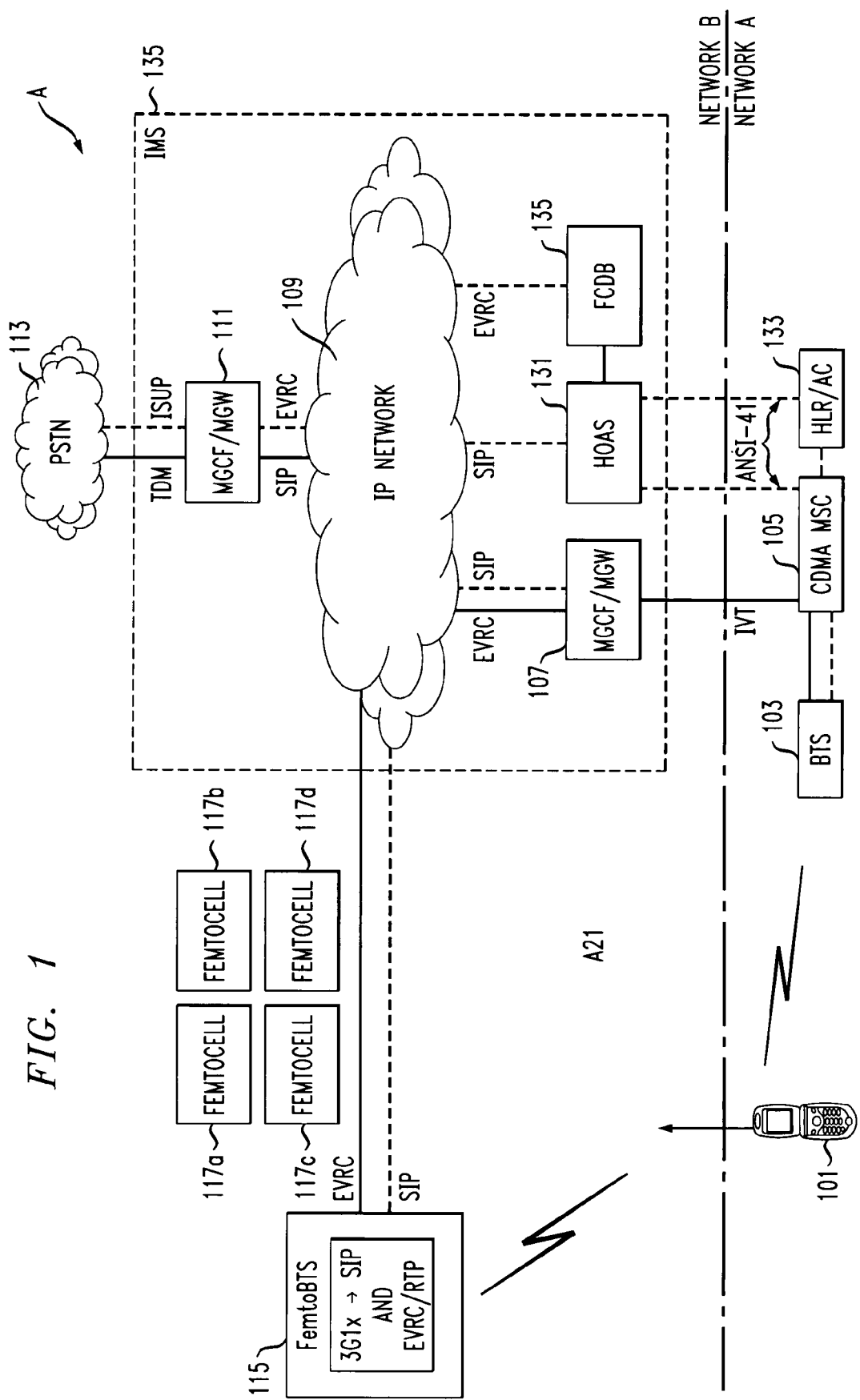
FIG. 1 illustrates a portion of the overall communications network including a mobile station, a base station, IMS network and a CDMA network.

Referring now to the drawings wherein the showings are for purposes of illustrating the disclosed embodiments only and not for purposes of limiting the same, FIG. 1 provides an overall view of a system into which the present disclosure may be incorporated. A communications infrastructure A is shown. Communications infrastructure A includes a mobile station 101, a base station transceiver subsystem 103, a mobile switching center (MSC) 105, a plurality of media gateways 107, 111, a FemtoBTS 115, the IP network 109, the public switched telephone network (PSTN) 113, a Hand-Off Application Server (HOAS) 131 and a variety of femtocells 117A, 117B, 117C and 117D. Generally, feature requests for the system will be networked back to the anchor MSC 105 including session control and supplemental features.

It should be noted that these elements are but one embodiment of the disclosure. These network elements may be configured in a number of ways and still fall within the spirit and scope of the claims. These network elements may also act in conjunction be divided amongst each other. It should be noted that this is but one embodiment of the disclosure.

In operation, as described in greater detail below, the presently described embodiments are directed towards method for a hand-off of a CDMA mobile station from a macrocell to a femtocell disclosure. This disclosure describes a solution to the current problem when facilitating a hand-off from legacy based network to an IP based network. There may be many femtocells in a neighbor list with the same identifier because PN offsets are usually used as identifiers. However, there are only a limited number of PN offsets.

PN offset may not be unique to a particularly femtocell. With many femtocells in range, it is difficult for the system to narrow in on the particular femtocell that should be identified in the hand-off. This disclosure details a solution to this problem. The system would keep track of each mobile which has been allowed access to each femtocell in the macrocell coverage area. When the mobile requests a hand-off, the system will recall which femtocell with a matching PN offset (or offsets) within that macrocell's coverage area has been allowed usage to that mobile in the past. Resources will be set up for all femtocells which have allowed access based on a priority list. The priority list is most likely potential targets for that particular mobile station.

Still referring to FIG. 1, the system includes the legacy based network A and the IMS network B. In this embodiment, the system includes a CDMA 3G1x mobile station 101. As shown it may be connected to a base station transceiver subsystem 103. The base station transceiver subsystem 103 in turn is in communication with a mobile switching center 105. The mobile switching center 105 is connected via an intervendor trunk to the first media gateway 107. The media gateway 107 is connected to the IP network 109 which is connected to the second media gateway 111. The second media gateway 111 offers a connection to the PSTN 113. The IP network 109 is also connected to an HOAS 131. Lastly, there are a number of femtocells which are connected to the IP network 109, a target femtocell 115 and those femto cells which are in the macrocell area 117A, 117B, 117C and 117D. The mobile station 101 may be currently on an active call or idle. Through methods known in the art, the handset would be in contact with a base station transceiver subsystem 103 which would in turn be in communication with the mobile switching center and a mobile gateway 107 in order to connect the call. Through this point the signal would be an ANSI-41 standard and as the signal crosses from network A to network B that the media gateway 107 the signal would convert to SIP messaging.

Continuing on with FIG. 1, this embodiment includes a mobile station 101 which is user equipment. However, other user equipment besides a mobile station shown may be substituted. Other examples of user equipment include, but are not limited to, wireless phones, VoIP telephones, laptop computers, desktop computers, WI-FI phones, etc. These devices are typical user equipment used to communicate through compatible lines. In this embodiment, the mobile station is a CDMA 3G1x handset which typically communicates through a base station transceiver subsystem 103.

In this disclosure the mobile station 101 is moving into contact with the target femtocell 115. The serving BTS 103 monitors the measurements provided by the mobile and determines if it is appropriate to handoff to target femtocell 115 with respect to a power threshold. If so the handoff is set up through the ANSI41 link to the HOAS131.

The hand-off request would be accompanied by a PN offset which is intended to identify the target femtocell 115. However, the PN offset is not unique to a target femtocell. There are a limited amount of PN offsets and because there any many femtocells in range, the identified PN offset is repeated. In this embodiment, the femtocells 117A, 117B, 117C and 117D also have the same PN offset as the target cell 115. The disclosed method is therefore invoked in order to hone in on the target femtocell 115, and not the other femtocells 117A-D.

The disclosed method includes tracking each femtocell for the mobile stations which have been allowed access. In this embodiment, only target femtocell 115 has allowed access in the past to the mobile station 101. Therefore, when the database is queried for this mobile's accesses, the only femtocell that has the mobile station identification number of the mobile station 101 is the target femtocell 115. Therefore, resources are allocated for the hand-off by femtocell 115.

In other embodiments, the mobile station 101 has in fact been on femtocell 117A as well as target femtocell 115. In this embodiment, both femtocells are contacted in order to set up resources. As only one message can be sent to the mobile by base station 103, the hand-off resource (Walsh Code or MAC ID) must be the same for all target femtocells. To accomplish this, the femtocells may partition their resources into those reserved for originations and those reserved for hand-offs. In addition, the database 135 will also record the last assigned hand-off resource for each femtocell. The intent is to select a resource that all target femtocells might have in common to reduce the time it takes to perform the hand-off. One possibility is to find the index of the last resource assigned by the highest priority target and select the first following resource that is unused by any of the highest priority candidates. All the targets will respond with an accept or deny, but will in addition send information from which the free resources can be determined. If any of the targets deny the request, the following invitation can be sure to find a common available resource. When all the targets accept, they will be asked to set up that resource to accept a hand-off, and the system will signal to the original network as to what resource the target of the hand-off is using.

As the hand-off is attempted to take place, only the target femtocell 115 is in range in order to complete the hand-off. Therefore, only target femtocell 115 would send a "hand-off complete" message to the mobile 101. In this embodiment the resources for the other femtocells 117A would be released after the hand-off complete message is received by the mobile. Once the hand-off is complete the call would be handled normally. If none of the targets receives the hand-off complete, the hand-off will fail, all the resources released, and, if the network settings are correct, the mobile will return to the macro network, if possible.

As the case with any of these functions, implementation of the various network elements depend on how the system is used. These functions may be performed by some or all of the network elements in conjunctions or separate from one another. This is but one embodiment of the proposed system and variations to the system may exist.

Figure 2A:
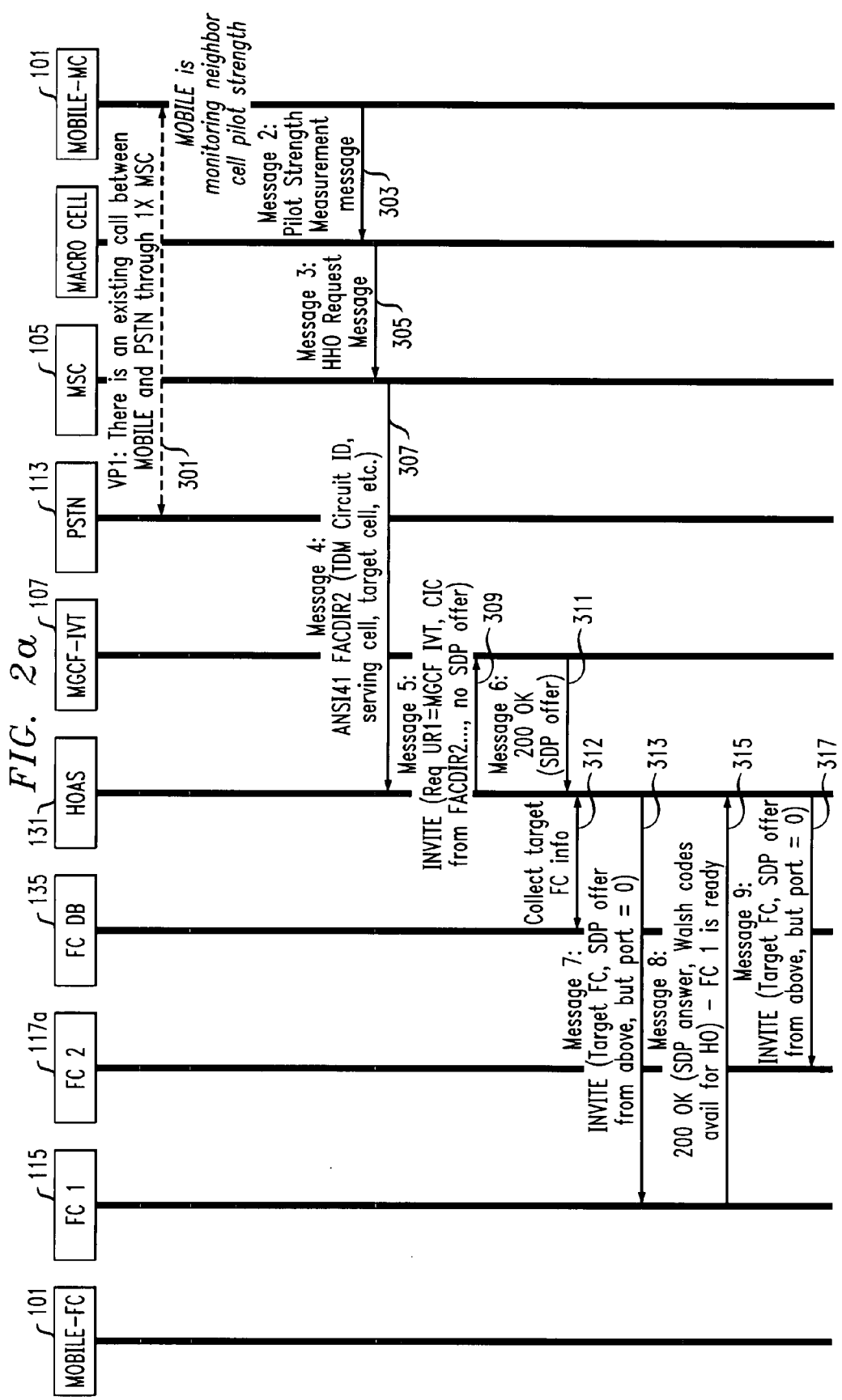
FIG. 2 is a flow chart illustrating one embodiment of the method according to the present disclosure.
Figure 2B:
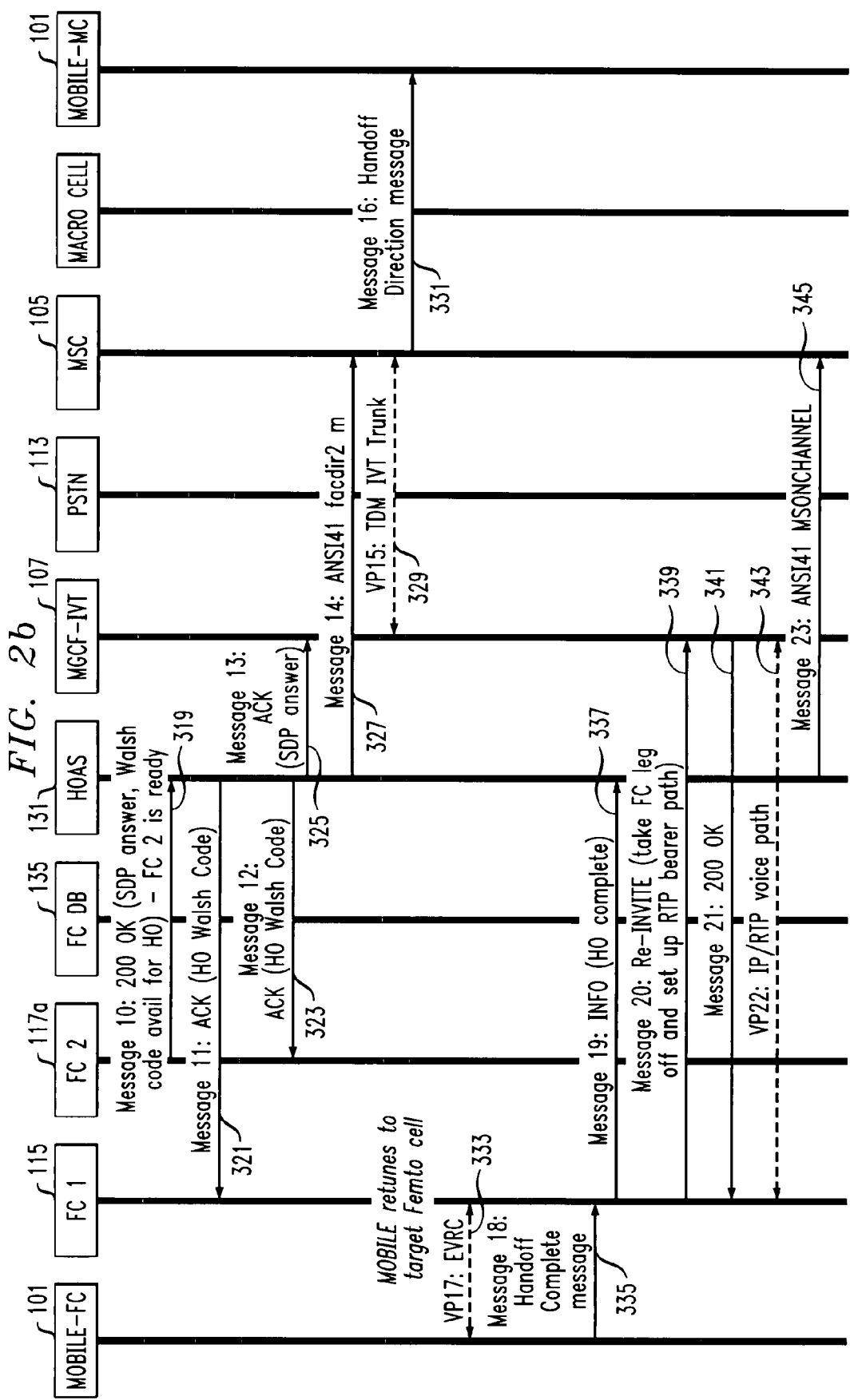

Now referring to FIG. 2, which is a flow illustrating one embodiment of the method according to the present disclosure. This embodiment includes many of the network elements that were illustrated in FIG. 1. These network elements include the mobile station on Network B (MOBILE-FC 101), a first femtocell, which is the target femtocell 115, a second femtocell which is located within the same macrocell and has the same PN offset 117A, a femtocell database 135, a hand-off application server 131, a media gateway connected to an intervendor trunk 107, a PSTN 113, an MSC 105, a macrocell for Network A, the mobile station (MOBILE-MC), 101 is connected to the macrocell network.

In this embodiment, the method begins with an existing call having taken place at 301. The existing call is between the mobile on Network A connected to the PSTN 113.

The method continues with step 303, message 2, the pilot strength message. In this step the strength of a femtocell signal, which has come into range and has passed the strength threshold and/or the macrocell has lost strength. In either case, a hand-off request is placed in message 3, at step 305.

The MSC 105 is then directed to send an ANSI-41 message, message 4, to the hand-off application server 131. The hand-off application server 131 would then send message 5 in step 309, an invite message, to the media gateway 107 indicating the desired circuit to be reserved for this handoff. The media gateway 107 at step 311 may then send message 6, a 200OK message, acknowledging the invite and including the Session Description Protocol (SDP) to be used for this handoff.

The next step in the method, at step 313, involves collecting the target femtocell information from the femtocell database 135. The information would generally include a PN offset. While looking for the target femtocell many femtocells may meet the criteria of having a PN offset of a certain number and be within the macrocell neighbor list of the mobile station 101. In this embodiment two femtocells, the target femtocell 115 and femtocell 2 117A meet this criteria. This method may also include criteria such as whether the femtocell has allowed access to the mobile station 101 before. Other criteria may be the number of times that access was allowed and/or the frequency in which access is allowed. This may then ignite a prioritized list based on these criteria and only the highest priority femtocells would receive an invite.

The invite takes place at steps 313-317. Message 7 shows an invite is sent to femtocell 1 at step 313. Message 8 is a response in the form of a 200OK message. Message 8 is sent from the femtocell to the hand-off application server 131 at step 315. The second invite is sent at step 317, message 9 which invites target femtocell. Again, a 200OK message is sent from the femtocell to the hand-off application server 131.

At step 321 and 323, an acknowledgement message is sent from the hand-off application server 131 to each femto cell 115, 117a. This message contains the radio resource (e.g. Walsh code or MAC ID) to be used in the attempt.

At step 325, message 13, an acknowledgement step is sent to the media gateway 107. An ANSI-41 facdir2 response message is sent at message 14 at step 327 to indicate the target femtoBTS information such as Walsh code and the intervendor trunk circuit is established at step 329. The hand-off direction message is sent at step 331 which is message 16 from the MSC 105 to the mobile 101.

Only one femtocell, the target femtocell 115 will send a hand-off complete message signaling that the hand-off was successful at step 335. At this point the hand-off complete message will reach the hand-off application server 131 at step 337. The invite message is then sent by the femtoBTS at step 339 to finalize the voice path through the IMS to the target femtoBTS. Message 21 is a 200OK message from the macrocell gateway 111. A voice path is connected at step 343 between the media gateway 107 and the target femtocell. The message completes with an ANSI-41 mobile station on channel message at step 345, message 16. Femtocell 117A may then release its resources because it was not the target femtocell 115. Therefore, the message is not carried on that femtocell and resources can be cleaned up.

The above description merely provides a disclosure of particular embodiments of the invention and is not intended for the purposes of limiting the same thereto. As such, the disclosure is not limited to only the above-described embodiments. Rather, it is recognized that one skilled in the art could conceive alternative embodiments that fall within the scope of the invention.

We claim

1. A method for handoff of a mobile station from a macrocell base station transceiver subsystem (BTS) to a target femtocell BTS, comprising:
    a) receiving a facilities directive message at a handoff application server (HOAS) requesting allocation of resources for a handoff of a mobile station from a macrocell BTS to a target femtocell BTS, wherein the mobile station is being served by the macrocell BTS and an associated mobile switching center (MSC), wherein the target femtocell BTS is associated with a group of femtocell BTSs among a plurality of femtocell BTSs within a communication infrastructure associated with the macrocell BTS, wherein each femtocell BTS in the femtocell group is associated with a group identifying code and the mobile station is associated with a station identification number, wherein the facilities directive message includes the group identifying code and the station identification number;
    b) sending a first invitation message from the HOAS to a media gateway requesting the media gateway to allocate resources for the handoff to the target femtocell BTS based at least in part on the group identifying code;
    c) collecting femtocell information at the HOAS from a femtocell database for at least a portion of the femtocell group, the femtocell database storing femtocell information for the plurality of femtocell BTSs, the femtocell information facilitating identification of the target femtocell BTS from the femtocell group, the femtocell portion of the femtocell group being within or adjacent to a coverage area associated with the macrocell BTS, wherein the collected femtocell information is based at least in part on the group identifying code and the station identification number;
    d) selecting a first femtocell BTS from the femtocell portion as a candidate for the target femtocell BTS based at least in part on the collected femtocell information; and
    e) sending a second invitation message to the first femtocell BTS requesting the first femtocell BTS to allocate resources for the handoff.

2. The method according to claim 1 wherein the group identifying code is a pseudorandom number (PN) offset.

3. The method according to claim 1 wherein the femtocell database includes information showing each femtocell BTS of the plurality of femtocell BTSs to which the mobile station is allowed access.

4. The method according to claim 1 wherein the femtocell database includes information showing each femtocell BTS of the plurality of femtocell BTSs that has allowed access to the mobile station, the method further comprising:
    f) using the femtocell information collected in c) to identify each femtocell BTS in the femtocell portion that has allowed access to the mobile station;
    wherein selection of the first femtocell BTS in d) is based at least in part on the first femtocell BTS having previously allowed access to the mobile station.

5. The method according to claim 1 wherein the femtocell database includes information showing how many times the mobile station has been previously allowed access to each femtocell BTS of the plurality of femtocell BTSs, the method further comprising:
    f) using the femtocell information collected in c) to create a priority list of candidates for the target femtocell BTS with higher priority given to femtocell BTSs that have allowed access to the mobile station more times;
    wherein selection of the first femtocell BTS in d) is based at least in part on the first femtocell BTS being the highest priority candidate on the priority list.

6. The method according to claim 1 wherein the femtocell database includes information showing a frequency the mobile station has been previously allowed access to each femtocell BTS of the plurality of femtocell BTSs, the method further comprising:
    f) using the femtocell information collected in c) to create a priority list of candidates for the target femtocell BTS with higher priority given to femtocell BTSs that have allowed access to the mobile station at higher frequencies;
    wherein selection of the first femtocell BTS in d) is based at least in part on the first emtocell BTS being the highest priority candidate on the priority list.

7. The method according to claim 1 wherein the facilities directive message in a) is an ANSI-41 FACDIR2 message.

8. The method according to claim 1 wherein the first and second invitation messages in b) and e) are session initiation protocol (SIP) INVITE messages.

9. The method according to claim 1, further comprising:
    f) sending a response message to the MSC indicating resources are allocated for the handoff and prompting the MSC to send a handoff direction message to the mobile station via the macrocell BTS directing the mobile station to tune to the target femtocell BTS;
    g) receiving a handoff complete message from the mobile station via the target femtocell BTS indicating the handoff was successful and confirming the first femtocell BTS is the target femtocell BTS;
    h) sending a mobile station on channel message from the HOAS to the MSC;

wherein the response message in f) is an ANSI-41 facdir2 message and the handoff complete message in g), at least from the target femtocell BTS to the HOAS, is a session initiation protocol (SIP) INFO message.

10. The method according to claim 1, further comprising:
f) selecting a second femtocell BTS from the femtocell portion as another candidate for the target femtocell BTS based at least in part on the collected femtocell information;
g) sending a third invitation message to the second femtocell BTS requesting the second femtocell BTS to allocate resources for the handoff;
h) sending a response message to the MSC indicating resources are allocated for the handoff and prompting the MSC to send a handoff direction message to the mobile station via the macrocell BTS directing the mobile station to tune to the target femtocell BTS;
i) receiving a handoff complete message from the mobile station via the target femtocell BTS indicating the handoff was successful and confirming the first femtocell BTS is the target femtocell BTS;
j) sending a mobile station on channel message from the HOAS to the MSC; and
k) releasing resources allocated for the handoff by the second femtocell BTS.

11. The method according to claim 1 wherein the mobile station is on an active call during the handoff.

12. The method according to claim 1, further comprising:
f) determining the handoff from the macrocell BTS to the target femtocell BTS is appropriate for the mobile station after the macrocell BTS receives a pilot strength message from the mobile station with a femtocell signal received by the mobile station from the target femtocell BTS, wherein the femtocell signal includes the group identifying code; and
g) sending a handoff request to the MSC requesting the handoff from the macrocell BTS to the target femtocell BTS;
wherein, in response to receiving the handoff request, the MSC sends the facilities directive message to the HOAS.

13. The method according to claim 1, further comprising:
f) receiving an acknowledgement message from the media gateway acknowledging receipt of the first invitation message and providing a session description protocol (SDP) to be used for the handoff;
wherein, in response to receiving the acknowledgement message, the HOAS collects the femtocell information in c).

14. The method according to claim 1, further comprising:
f) receiving an acknowledgement message from the first femtocell BTS acknowledging receipt of the second invitation message and providing an available radio resource for the handoff; and
g) sending a response message to the first femtocell BTS identifying an allocated radio resource for the handoff based at least in part on the available radio resource;
wherein radio resources associated with the first femtocell BTS include a Walsh code or a media access control identifier (MAC ID).

15. An apparatus to facilitate a handoff of a mobile station from a macrocell base station transceiver subsystem (BTS) to a target femtocell BTS, comprising:
a handoff application server (HOAS) configured to receive a facilities directive message from a mobile switching center (MSC) requesting allocation of resources for a handoff of a mobile station from a macrocell BTS to a target femtocell BTS, wherein the mobile station is being served by the macrocell BTS and the MSC, wherein the target femtocell BTS is associated with a group of femtocell BTSs among a plurality of femtocell BTSs within a communication infrastructure associated with the macrocell BTS, wherein each femtocell BTS in the femtocell group is associated with a group identifying code and the mobile station is associated with a station identification number, wherein the facilities directive message includes the group identifying code and the station identification number;
a media gateway configured to receive a first invitation message from the HOAS requesting the media gateway to allocate resources for the handoff to the target femtocell BTS based at least in part on the group identifying code; and
a femtocell database configured to store femtocell information for the plurality of femtocell BTSs, the femtocell information facilitating identification of the target femtocell BTS from the femtocell group;
wherein the HOAS is configured to collect femtocell information from the femtocell database for at least a portion of the femtocell group, the femtocell portion of the femtocell group being within or adjacent to a coverage area associated with the macrocell BTS, wherein the collected femtocell information is based at least in part on the group identifying code and the station identification number;
wherein the HOAS is configured to select a first femtocell BTS from the femtocell portion as a candidate for the target femtocell BTS based at least in part on the collected femtocell information;
wherein the HOAS is configured to send a second invitation message to the first femtocell BTS requesting the first femtocell BTS to allocate resources for the handoff.

16. The apparatus according to claim 15 wherein the mobile station is a code division multiple access (CDMA) mobile station.

17. The apparatus according to claim 15 wherein the macrocell BTS and MSC are associated with a legacy based network.

18. The apparatus according to claim 15 wherein the plurality of femtocell BTSs, HOAS, media gateway, and femtocell database are associated with an internet protocol (IP) multimedia subsystem (IMS) network.

19. A method for handoff of a mobile station from a macrocell base station transceiver subsystem (BTS) to a target femtocell BTS, comprising:
a) receiving a facilities directive message at a handoff application server (HOAS) requesting allocation of resources for a handoff of a mobile station from a macrocell BTS to a target femtocell BTS, wherein the mobile station is being served by the macrocell BTS and an associated mobile switching center (MSC), wherein the target femtocell BTS is associated with a group of femtocell BTSs among a plurality of femtocell BTSs within a communication infrastructure associated with the macrocell BTS, wherein each femtocell BTS in the femtocell group is associated with a group identifying code and the mobile station is associated with a station identification number, wherein the facilities directive message includes the group identifying code and the station identification number;
b) sending a first invitation message from the HOAS to a media gateway requesting the media gateway to allocate resources for the handoff to the target femtocell BTS based at least in part on the group identifying code;

c) collecting femtocell information at the HOAS from a femtocell database for at least a portion of the femtocell group, the femtocell database storing femtocell information for the plurality of femtocell BTSs, the femtocell information facilitating identification of the target femtocell BTS from the femtocell group, the femtocell portion of the femtocell group being within or adjacent to a coverage area associated with the macrocell BTS, wherein the femtocell database includes information showing each femtocell BTS of the plurality of femtocell BTSs that has allowed access to the mobile station and the collected femtocell information is based at least in part on the group identifying code, station identification number, and information showing whether the corresponding femtocell BTSs have allowed access to the mobile station;

d) using the femtocell information collected in c) to identify each femtocell BTS in the femtocell portion that has allowed access to the mobile station;

e) selecting a first femtocell BTS from the femtocell portion as a candidate for the target femtocell BTS based at least in part on the first femtocell BTS having previously allowed access to the mobile station; and f) sending a second invitation message to the first femtocell BTS requesting the first femtocell BTS to allocate resources for the handoff.

20. The method according to claim 19 wherein the femtocell database includes information showing how many times the mobile station has been previously allowed access to each femtocell BTS of the plurality of femtocell BTSs.

21. The method according to claim 20, further comprising:

g) using the femtocell information collected in c) to create a priority list of candidates for the target femtocell BTS with higher priority given to femtocell BTSs that have allowed access to the mobile station more times;

wherein selection of the first femtocell BTS in e) is based at least in part on the first femtocell BTS being the highest priority candidate on the priority list.

22. The method according to claim 21 wherein the femtocell database includes information showing a frequency the mobile station has been previously allowed access to each femtocell BTS of the plurality of femtocell BTSs.

23. The method according to claim 22, further comprising:

g) using the femtocell information collected in c) to create a priority list of candidates for the target femtocell BTS with higher priority given to femtocell BTSs that have allowed access to the mobile station at higher frequencies;

wherein selection of the first femtocell BTS in e) is based at least in part on the first femtocell BTS being the highest priority candidate on the priority list.

24. The method according to claim 19, further comprising:

g) selecting a second femtocell BTS from the femtocell portion as another candidate for the target femtocell BTS based at least in part on the collected femtocell information;

h) sending a third invitation message to the second femtocell BTS requesting the second femtocell BTS to allocate resources for the handoff;

i) sending a response message to the MSC indicating resources are allocated for the handoff and prompting the MSC to send a handoff direction message to the mobile station via the macrocell BTS directing the mobile station to tune to the target femtocell BTS;

j) receiving a handoff complete message from the mobile station via the target femtocell BTS indicating the handoff was successful and confirming the first femtocell BTS is the target femtocell BTS;

k) sending a mobile station on channel message from the HOAS to the MSC; and l) releasing resources allocated for the handoff by the second femtocell BTS.

25. The method according to claim 19, further comprising:

g) receiving an acknowledgement message from the first femtocell BTS acknowledging receipt of the second invitation message and providing an available radio resource for the handoff; and h) sending a response message to the first femtocell BTS identifying an allocated radio resource for the handoff based at least in part on the available radio resource;

wherein radio resources associated with the first femtocell BTS include a Walsh code or a media access control identifier (MAC ID).

* * * * *